United States Patent [19]

Larrabee et al.

[11] Patent Number: 4,820,117
[45] Date of Patent: Apr. 11, 1989

[54] CROSSED I-BEAM STRUCTURAL STRUT

[75] Inventors: John R. Larrabee, Portland; Philip F. Kravsow, East Hartford, both of Conn.

[73] Assignee: United Technologies Corporation, Hartford, Conn.

[21] Appl. No.: 71,516

[22] Filed: Jul. 9, 1987

[51] Int. Cl.⁴ .............................................. F01D 25/16
[52] U.S. Cl. .................................. 415/142; 416/233; 416/241 R
[58] Field of Search ............... 415/142, 191, 115, 116, 415/210; 416/223 R, 223 A, 226, 227, 229 R, 229 A, 231 R, 231 B, 232, 233, 241 R, 241 A

[56] References Cited

U.S. PATENT DOCUMENTS

| 1,939,357 | 12/1933 | Lorenzen | 416/232 |
|---|---|---|---|
| 1,992,338 | 2/1935 | Whitworth | 416/233 |
| 2,430,854 | 11/1947 | Berliner | 416/232 |
| 2,493,139 | 1/1950 | Heath | 416/233 |
| 2,616,662 | 11/1952 | Mierley | 60/200.1 |
| 2,734,586 | 2/1956 | Wright et al. | 416/229 |
| 2,941,781 | 6/1960 | Boyum | 415/142 |
| 3,093,219 | 6/1966 | Ramme | 416/233 |
| 3,250,512 | 5/1966 | Petrie | 415/135 |
| 3,398,535 | 8/1968 | Campbell et al. | 60/226 |
| 3,620,641 | 11/1971 | Keen et al. | 415/170 |
| 3,830,058 | 8/1974 | Ainsworth | 60/226 R |
| 3,902,314 | 9/1975 | Straniti | 60/39.31 |
| 4,240,250 | 12/1980 | Harris | 60/39.09 |
| 4,304,522 | 12/1981 | Newland | 415/135 |
| 4,428,713 | 1/1984 | Coplin et al. | 415/48 |
| 4,492,518 | 1/1985 | Neal | 415/142 |

FOREIGN PATENT DOCUMENTS

| 400839 | 12/1942 | Belgium | 416/233 |
|---|---|---|---|
| 720277 | 10/1965 | Canada | 416/233 |
| 2242988 | 3/1974 | Fed. Rep. of Germany . | |
| 464225 | 1/1951 | Italy . | |
| 495173 | 6/1954 | Italy | 416/232 |
| 2046849 | 11/1980 | United Kingdom . | |

Primary Examiner—Robert E. Garrett
Assistant Examiner—John T. Kwon
Attorney, Agent, or Firm—James M. Rashid

[57] ABSTRACT

An improved structural strut for use in the fan section of a high bypass ratio gas turbine engine is described. The strut includes two I-beam shaped structural supports which are substantially perpendicular to each other, and extend along the major and minor axes of the strut, from the strut base to the strut tip. Face sheets, preferably made of composite material, are attached to both of the I-beam supports for acoustic damping effects.

15 Claims, 3 Drawing Sheets

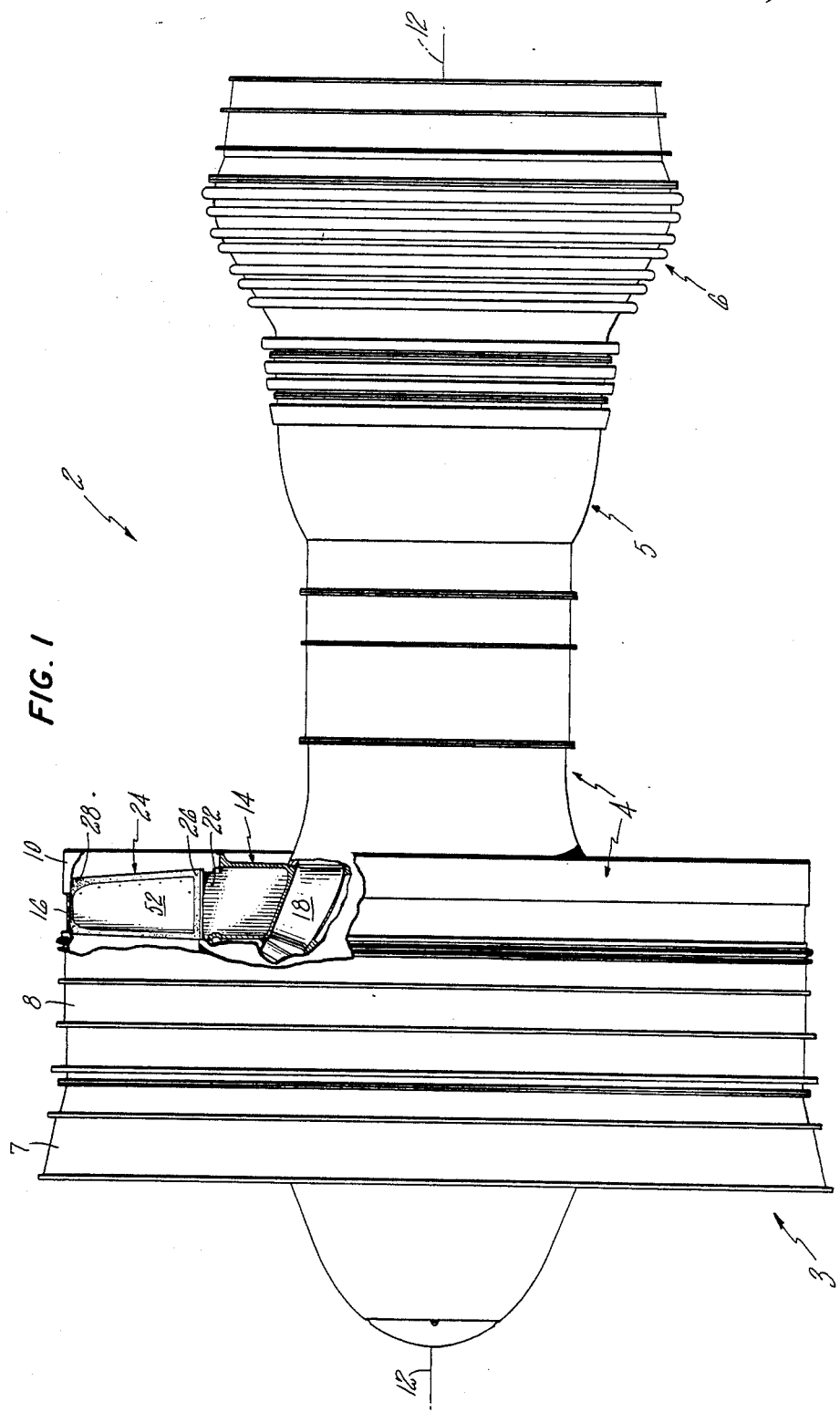

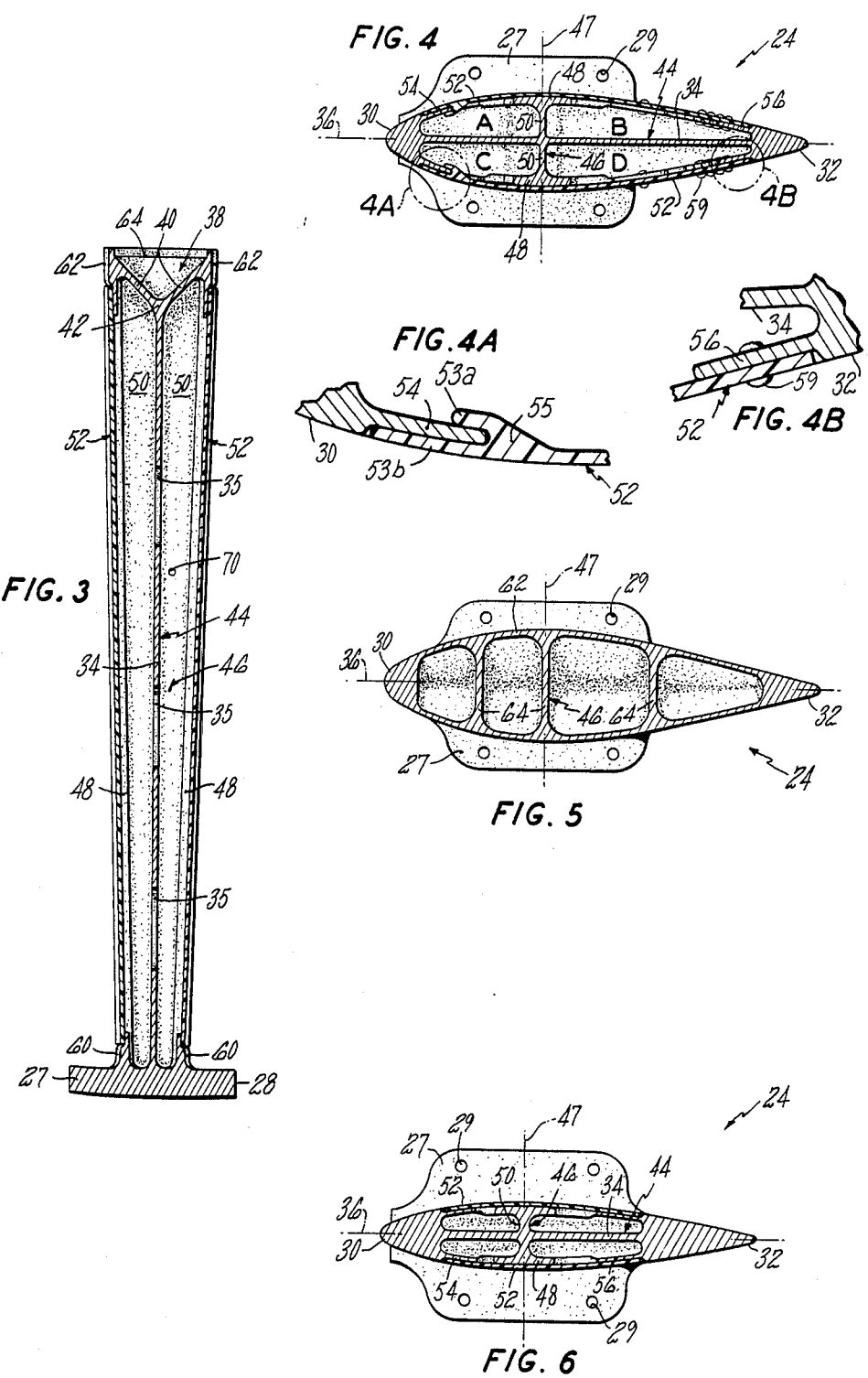

CROSSED I-BEAM STRUCTURAL STRUT

TECHNICAL FIELD

This invention relates to struts, particularly those used in gas turbine engines.

BACKGROUND

Gas turbine engines of the axial flow type include a fan section, a compressor section, a combustion section, and a turbine section. One or more shafts extend axially through the engine from the fan section through the turbine section and rotate spaced apart stages of disks. Each disk carries circumferentially spaced apart blades which extend radially across a flowpath. The shafts are supported by various types of bearing support structures through the engine. In the fan section of high bypass ratio engines, the shaft is supported upon bearings carried by an intermediate case (or fan exit case) which includes a centerbody, an outer ring which is concentric with the centerbody, and circumferentially spaced apart struts which extend radially from the centerbody to the outer ring. Bearing support structures for gas turbine engines are shown in U.S. Pat. Nos. 4,492,518 to Neal, 3,620,641 to Keem, and 2,616,662 to Mierley. These structures show struts which are welded together or assembled with mechanical type fasteners. Bearing support structures of a more general nature are shown in British patent No. 2 046 849, Italian Pat. No. 464225, German patent 2 242 988 and U.S. Pat. Nos. 2,941,781, 3,250,512, 3,398,535, 3,830,058, 3,902,314, 4,240,250, 4,304,522, and 4,428,713.

Advanced gas turbine engines require components capable of supporting heavy loads, and which are readily fabricated and cost effective. This invention addresses these needs, and provides an improved strut for the engine industry.

SUMMARY OF THE INVENTION

According to this invention, a bearing support structure for a gas turbine engine comprises an annular centerbody, an outer ring concentric with and radially outward of the centerbody, and a circumferential row of airfoil shaped struts which extend from the centerbody to the outer ring, wherein each strut comprises a base portion attached to the centerbody and a tip portion attached to the outer ring, forward and rearward edges which extend from the strut base to the strut tip, and face sheets which are attached to the forward and rearward edges, each strut further comprising first and second webs which are integral with each other and which extend from the base to the tip, the first web extending from the strut forward edge to the strut rearward edge and the second web extending transversely to the first web, the second web having opposed ends on each side of the first web, each end having a flange thereon which is substantially perpendicular to the second web and which extends from the base to the tip.

The strut is particularly suited for use in the fan intermediate case of a high bypass ratio gas turbine engine. The first and second strut webs and the flanges at each end thereof (the forward and rearward edges are the flanges on the first web) define a crossed I-beam structure, which supports force loads imposed on the strut during engine operation.

In the preferred embodiment of the invention, the crossed I-beam structure is a one piece metal casting, and the face sheets are made of composite material which attenuates noise produced by operation of the engine. Other features and advantages of the invention will be more apparent in light of the detailed description which follows below, as illustrated in the drawings.

BRIEF DESCRIPTION OF THE DRAWING

FIG. 1 is a simplified side view, partly broken away, of a high bypass ratio gas turbine engine.

FIG. 3 is a cross-sectional view along the lines 3—3 of FIG. 2.

FIG. 4 is a cross-sectional view along the lines 4—4 of FIG. 2.

FIG. 4a is an enlarged view of the circled area at the strut leading edge in FIG. 4.

FIG. 4b is an enlarged view of the circled area at the strut trailing edge in FIG. 4.

FIG. 5 is a cross-sectional view along the lines 5—5 of FIG. 2.

FIG. 6 is a cross-sectional view along the lines 6—6 of FIG. 2.

BEST MODE FOR CARRYING OUT THE INVENTION

Figure 1A:
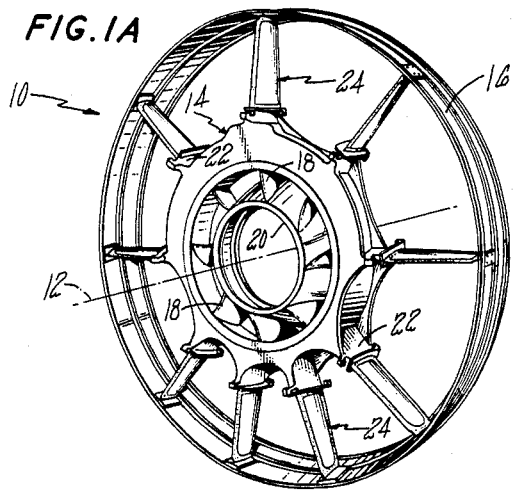
FIG. 1a is a simplified perspective view showing the axially rearward side of an intermediate case assembly for a high bypass ratio gas turbine engine.

FIG. 1 shows a side view of a high bypass ratio gas turbine engine 2. The engine 2 includes a fan section 3, a compressor section 4, a combustion section 5, and a turbine section 6. The outer boundary of the flowpath through the fan section 3 is defined by the inner surfaces of a fan containment case 7, a fan exit case 8, and an intermediate case 10 (sometimes referred to as a fan exit case, rear).

As seen in FIG. 1a, the intermediate case 10 is an assembly of several components which includes an annular centerbody 14 and an outer case ring 16, both concentric with the engine axis of rotation 12. The centerbody 14 includes radially extending circumferentially spaced apart core flowpath struts 18 which direct the working medium fluid through the core section of the engine. The core flowpath struts 18 terminate radially inwardly at a bore 20 which carries bearings (not shown) which support the engine shaft (not shown). Attached to centerbody strut standoffs 22, and extending radially outwardly to the outer ring 16, are fan flowpath struts 24. The fan flowpath struts 24 are circumferentially spaced apart and attached to the centerbody 14 and outer ring 16 by conventional means. In the intermediate case 10 shown in FIG. 1, the radially inner end of each strut 24 is welded to a strut standoff 22; the radially outer end of each strut 24 is mechanically fastened by bolts to the outer ring 16.

Figure 2:
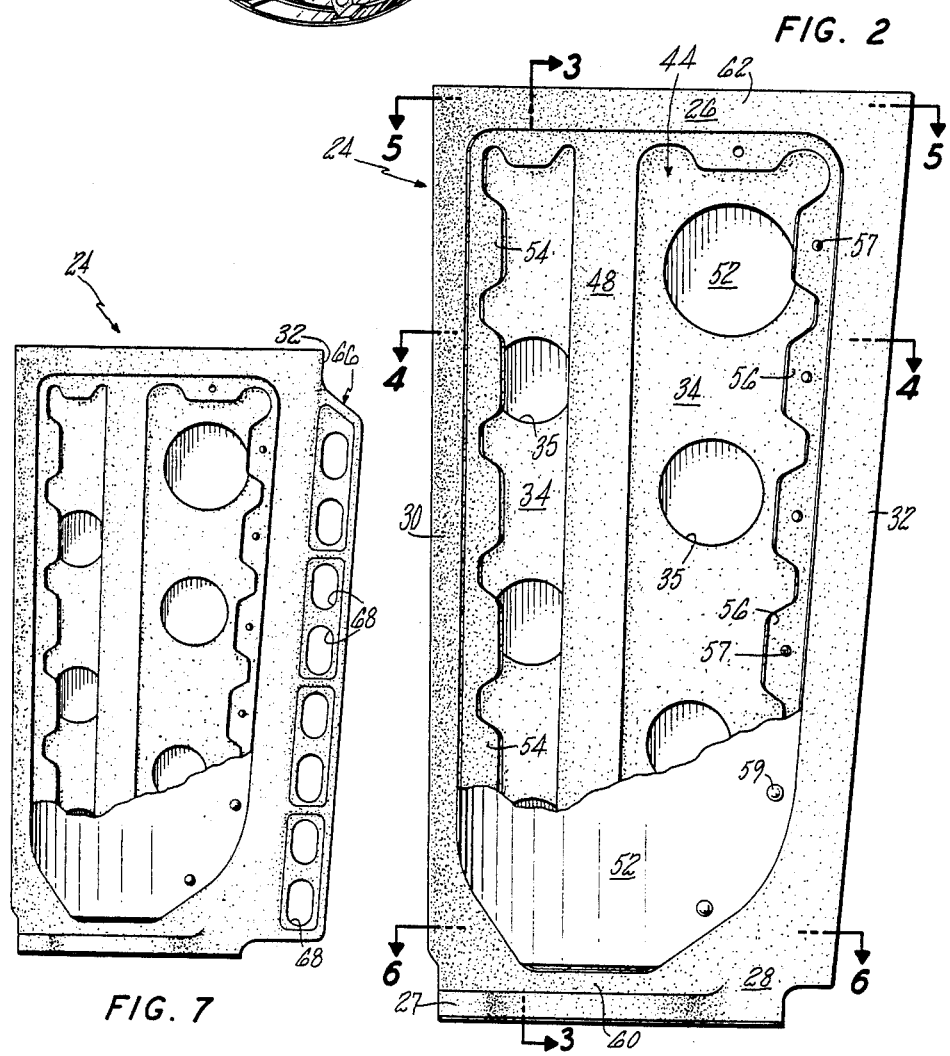
FIG. 2 is a side view, partly broken away, of a fan flowpath strut according to this invention.

As shown in FIGS. 2 and 3, the fan flowpath struts 24 are one piece castings, as opposed to the welded sheet metal struts of the prior art. The invention struts are therefore significantly easier to fabricate, more cost effective, and have superior properties as compared to the welded struts of the prior art. Each strut 24 includes a radially inner base portion 26 for attachment to the case centerbody 14 and a radially outer tip portion 28 for attachment to the outer ring 16. A flange 27 at the tip portion 28 has holes 29 for receiving bolts (not shown), which attach the strut 24 to the outer ring 16.

The strut leading edge 30 extends along the longitudinal length of the strut 24, at the axially forward, or leading, end of the strut 24. The leading edge 30 extends from the base 26 to the tip 28. Similarly, the strut trailing edge 32 extends from the base 26 to the tip 28 at the axially rearward end of the strut 24. The terms "leading edge" and "trailing edge" are used to define the structural portion of the strut 24 at its forward and rearward ends, respectively.

Referring now to FIGS. 2-6, the strut 24 includes a thin web 34 which extends along the major axis 36 of the strut 24. The strut major axis 36 extends from the strut leading edge 30 to the strut trailing edge 32, along the midsection of the strut 24. The major axis web 34 is integral with the leading and trailing edges, 30 and 32, respectively, and extends along the length of the strut 24, from the strut base 26 to the strut tip 28. Lightening holes 35 in the web 34 decrease the overall weight of the strut 24. As is seen in FIG. 3, near the base portion 26, the web 34 branches to form a V-shaped transition web 38 having legs 40 which extend outwardly from a vertex 42. The leading edge 30, trailing edge 32, and web 34 define a major axis I-beam 44, where the leading and trailing edges act as flanges of the beam 44. The major axis beam 44 carries the maximum axis bending loads (compression and tension) imposed upon the strut 24 and the fan case 10 during engine operation. The transition web 38 carries shear loads during engine operation.

Extending transversely to the major axis I-beam 44 is a minor axis I-beam 46. The minor axis I-beam 46 is integral with and crosses (intersects) the major axis I-beam 44, and extends longitudinally between the base and tip portions 26 and 28, respectively, along the minor strut axis 47. The minor axis I-beam 46 is comprised of longitudinally extending flanges 48 on each side of the major axis web 34, and a minor axis web 50 which is integral with the flanges 48 and with the major axis web 34. The minor axis flanges 48 extend from the strut base 26 to the strut tip 28, and as best shown in FIG. 3, converge towards the major axis web 34 moving from the base 26 to the tip 28.

The minor axis web includes an air hole 70 which, in cooperation with the lightening holes 35, allows air to move between the quadrants (or compartments) A, B, C, D defined by the major and minor axis beams 44 and 46, respectively, and the strut face sheets 52. (See FIGS. 4 and 6.) The hole 70 promotes pressure equalization between the quadrants during engine operation. This feature is discussed in more detail below.

Face sheets 52 extend from the leading edge 30 to the trailing edge 32 on each side of the strut 24. The face sheets 52 span the midchord section of the strut 24, in abutting relation to each minor axis flange 48. FIG. 2 shows that the face sheets 52 do not completely close off the quadrants A, B, C, D near the strut tip 28, so as to allow air to pass freely into the quadrants. As is best seen in FIG. 4a, each face sheet 52 is attached at the strut leading edge 30 to a lip 54 which extends in the rearward direction, towards the trailing edge 32. The lip 54 engages opposed inner and outer face sheet fingers 53a, 53b, respectively, which define a bifurcated leading edge 55 on the face sheet 52. Each leading edge lip 54 is recessed from the surface of the leading edge 30 a thickness equal to the thickness of the face sheet outer finger 53b. This provides a smooth aerodynamic surface from the leading edge of the strut to the surface of the face sheet. As shown in FIG. 4b, at the strut trailing edge 32, each face sheet 52 abuts strut lip 56 which extends in the forward direction. The trailing edge lips 56 are recessed from the surface of the trailing edge 32 for reasons similar to those mentioned above.

As is best seen in FIG. 2, the distance that the leading edge lips 54 extend in the rearward direction varies along tee length of the strut 24; likewise, the distance that the trailing edge lips 56 extend in the forward direction varies along the length of the strut 24. The reason that the lips 54, 56 have varying lengths and define a scalloped shape, is to divorce them from the structural load path during engine operation. The thin lips 54, 56 are not intended to be structural (load-bearing) in nature, but rather, to provide means for attaching the face sheets 52 to the strut 24. Adhesive resin, not shown in the FIGS., is used to secure the face sheets 52 to the strut lips 54, 56 and to the minor axis flanges 48. The use of adhesive resin is discussed in more detail below. Rivets 59 may also be used to secure the face sheets 52 to the strut. The rivets 59 extend through holes 57 in the trailing edge lips 56. (For clarity, the rivets 59 are not shown in FIG. 4b.)

Near the strut base and tip portions 26 and 28, respectively, the minor axis flanges 48 are integral with the leading and trailing edge lips 54 and 56, respectively. See FIG. 5. As a result, the flanges 48 are integral with the leading and trailing edges 30 and 32, respectively, and define a continuous wall which circumscribes the strut 24 at the base and tip portions 26 and 28, respectively. The wall is designated with the reference numeral 62 at the strut base 26, and 60 at the strut tip 28. The legs 40 of the transition web 38 are integral with the base portion wall 62, and to provide increased strength at the base 26, ribs 64 extend transversely between the walls 62, substantially parallel to the strut minor axis 47.

FIGS. 2 and 4-6 show that the strut chord dimension (i.e., the dimension from the leading edge 30 to the trailing edge 32) decreases from the strut base 26 to the strut tip 28. Also, the distance along the minor strut axis 47, between the minor axis flanges 48, decreases from the base 26 to the tip 28.

The shape of the load bearing portion of the strut 24 (i.e., the strut 24 as shown in FIG. 2, less the face sheets 52 and rivets 59) makes it particularly suitable for fabrication using casting techniques. The crossed I-beam structure (the major axis I-beam 44 and the minor axis I-beam 46 are substantially perpendicular to, and cross, each other) provides the tensile, compressive, and shear structural requirements for the strut 24. As a result, nonstructural (nonload bearing) face sheets 52 may be used. For example, the strut body (i.e., the casting) can be made of a martensitic iron base alloy such as the alloy commercially known as 17-4PH, and the face sheets can be made of lightweight aluminum or titanium alloys. Composite materials may also be used as face sheets. In a preferred embodiment of this invention, acoustically treated Kevlar ® (E. I. duPont Co., Wilmington, DE) composite material face sheets are utilized. The use of composite materials as the strut face sheets 52 is particularly desired, as such materials provide sound and vibration damping to the engine. Up until this invention, struts with acoustic face sheets have not been fabricable due to the requirement that the face sheets provide structural support to the strut. According to this embodiment of the invention, the composite acoustic face sheets 52 are nonstructural in nature, and extend along the length of the strut 24, from the leading edge 30 to the trailing edge 32, directly attached to both edges 30, 32 and to the minor axis flange 48. The sheets 52 span the gap between the edges 30, 32 and the flanges 48.

Because the face sheets 52 do not bear any structural loads during engine operation, adhesive resin may be used to secure them to the strut 24. Accordingly, there is no requirement that the strut body and face sheets be made of the same material as was required of prior art struts to avoid galvanic effects or to match coefficient of thermal expansion, etc.

As noted above, the major axis web 34 includes lightening holes 35 which cooperate with the air hole 70 and allow air to pass between the quadrants A, B, C, D. Free passage of air is desired when the face sheets 52 are made of a material which does not allow air to pass through it, i.e., when the sheets 52 are impervious to air. In the preferred embodiment of this invention, porous composite face sheets 52 are used; to prevent pressure imbalances within the strut which might collapse the composite material face sheets, the lightening holes 35 are sealed shut.

Figure 7:
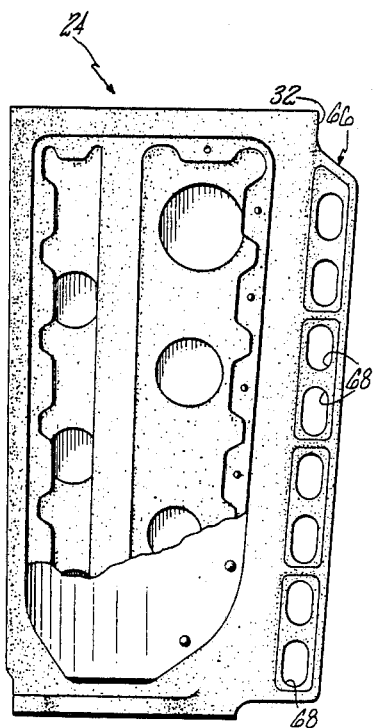
FIG. 7 is a side view of an alternate embodiment of the fan flowpath strut of this invention.

A further advantage of the geometry of the invention strut and the use of casting techniques to make it, is that various features can be easily added to the strut 24, or changes easily made to its overall shape. As shown in FIG. 7, a bumper 66 which is integral with the strut trailing edge 32, can be provided to prevent damage to the strut 24, during engine assembly or service use. The bumper includes lightening holes 68 to decrease its weight. The size and shape of features such as the flanges 27 can be altered in response to structural requirements.

Although this invention has been shown and described with respect to a preferred embodiment, it will be understood by those skilled in the art that various changes in form and detail thereof may be made without departing from the spirit and scope of the claimed invention.

We claim:

1. A strut for a bearing support structure for a gas turbine engine, said support structure comprising an annular inner support, a concentric annular outer support, and a plurality of said struts extending therebetween and attached thereto, each strut comprising:
    (a) a base portion for attachment to said inner support structure;
    (b) a tip portion for attachment to said outer support structure;
    (c) a forward edge extending between said base portion and said tip portion;
    (d) a rearward edge extending between said base portion and said tip portion;
    (e) a first web integral with said forward and rearward edges, and extending between said base and tip portions; and
    (f) a second web integral with said first web and extending between said base and tip portions transversely to said first web, said second web including spaced apart flanges substantially perpendicular to said second web, each flange extending between said base and tip portions on each side of said first web.

2. The strut according to claim 1, further comprising face sheets attached to said forward and rearward edges and to said flanges, said face sheets extending from said strut base to said strut tip.

3. The strut according to claim 1, wherein said forward and rearward edges are integral with said flanges at said base portion, and define a wall which circumscribes said strut.

4. The strut according to claim 3, wherein said first web includes a V-shaped transition web having legs which are integral with said wall.

5. The strut according to claim 4, further comprising ribs which extend transversely between said wall.

6. The strut according to claim 1, wherein said first web includes lightening holes.

7. An airfoil shaped cast strut for a gas turbine engine intermediate case, the engine having an axis of rotation, wherein the intermediate case comprises a case centerbody, a case outer ring, and a plurality of said struts, each strut comprising:
    (a) a base portion for attachment to said case centerbody;
    (b) a tip portion for attachment to said case outer ring;
    (c) a leading edge and a trailing edge, each edge extending from said base portion to said tip portion, said edges defining a major strut axis extending therebetween, wherein said leading edge includes lip means extending towards said trailing edge, and said trailing edge includes lip means extending towards said leading edge;
    (d) a major axis web integral with said leading and trailing edges, and extending between said base and tip portions along said major strut axis;
    (e) an I-beam integral with said major axis web, and extending between said base portion and said tip portion, wherein said I-beam includes an I-beam web extending transversely to said major axis web, said I-beam web having opposed ends on each side of said major axis web and a flange at each of said I-beam web ends, each flange extending substantially perpendicular to said I-beam web; and
    (f) face sheets on each side of said major axis web, each face sheet attached to one of said leading edge lip means and to one of said trailing edge lip means, wherein each face sheet is in abutting relation to one of said flanges.

8. The strut according to claim 7, wherein said leading and trailing edge lip means are integral with said I-beam flanges at said strut base portion, and define a wall which circumscribes said strut.

9. The strut according to claim 8, wherein said major axis web includes a V-shaped transition web having legs which extend towards said base portion, wherein said legs are integral with said wall.

10. The strut according to claim 9, further comprising ribs which extend transversely between said wall.

11. The strut according to claim 7, wherein said face sheets are a composite material.

12. The strut according to claim 11, wherein said face sheets are an acoustically damping composite material.

13. The strut according to claim 7, further including lightening holes in said major axis web means.

14. An intermediate case for a high bypass ratio gas turbine engine having an axis of rotation, wherein said case comprises a centerbody and an outer ring concentric thereto and radially outwardly therefrom, and a plurality of circumferentially spaced apart airfoil shaped struts extending radially between said centerbody and said outer ring, wherein each of said struts comprises:
    (a) a base portion attached to said centerbody;

(b) a tip portion attached to said outer ring;
(c) a leading edge and trailing edge, each edge extending from said base portion to said tip portion, wherein said edges define a major strut axis extending therebetween, and wherein said leading edge includes lip means extending towards said trailing edge, and said trailing edge includes lip means extending towards said leading edge;
(d) a major axis web integral with said leading and trailing edges and extending between said base and tip portions along said major strut axis; (e) an I-beam integral with said major axis web, and extending between said base and tip portions, said I-beam comprising an I-beam web extending transversely to said major axis web, said I-beam web having opposed ends on each side of said major axis web and a flange at each of said I-beam web ends, each flange extending substantially perpendicular to said I-beam web;
(f) acoustic damping face sheets, extending from said leading edge lip means to said trailing edge lip means, each face sheet means attached to said lip means and to one of said I-beam flanges.

15. The intermediate case according to claim 14, wherein the strut face sheets are made of a composite material.

* * * * *